United States Patent [19]

Kieft

[11] Patent Number: 4,910,596
[45] Date of Patent: Mar. 20, 1990

[54] HIGH BANDWIDTH PLURAL SPOT VIDEO PROCESSOR

[75] Inventor: John H. Kieft, Lexington, Mass.

[73] Assignee: The Charles Stark Draper Laboratories, Inc., Cambridge, Mass.

[21] Appl. No.: 64,238

[22] Filed: Jun. 30, 1987

[51] Int. Cl.$^4$ .............................................. H04N 5/14
[52] U.S. Cl. ..................................... 358/160; 358/107
[58] Field of Search ............... 358/160, 903, 107, 108, 358/125, 126, 280, 22, 139, 148, 149; 365/230, 189; 340/750, 798, 802, 814; 356/384, 385, 373, 375; 364/516, 517

[56] References Cited

U.S. PATENT DOCUMENTS

| | | | |
|---|---|---|---|
| 4,148,070 | 4/1979 | Taylor | 358/160 |
| 4,385,834 | 5/1983 | Maxwell, Jr. | 356/153 |
| 4,401,886 | 8/1983 | Pond et al. | 250/203 |
| 4,457,621 | 7/1984 | Harris et al. | 356/5 |
| 4,494,141 | 1/1985 | Altekruse | 358/111 |
| 4,571,633 | 2/1986 | Kondo | 358/280 |
| 4,717,955 | 1/1988 | Krufka | 358/101 |

Primary Examiner—James J. Groody
Assistant Examiner—David E. Harvey
Attorney, Agent, or Firm—Weingarten, Schurgin, Gagnebin & Hayes

[57] ABSTRACT

A high bandwidth multiple spot video processing system includes a mosaic array, a dual memory buffer, and a processor. The array and dual memory buffer, operative independently of the processor, are cooperative to provide digital data representative of the spatial intensity distribution of a two-dimensional input signal incident on the mosaic array at a selectable frame rate. A buffer controller, coupled to the processor and to the dual memory buffer, for implementing a communications protocol that allows the processor to selectively operate in a mode synchronous with the data frame rate or asynchronous with the data frame rate to respectively provide a real-time processing mode and a special processing capability. The dual memories of the dual memory buffer each share the same address space of the global memory of the processor. In the real-time processing mode, the buffer memories are physically switched between the array and the processor such that while one buffer memory is being read by the processor the other buffer memory is being written by the photoarray. Speed up and signal conditioning electronics associated with the photoarray are included in the processing system.

14 Claims, 4 Drawing Sheets

HIGH BANDWIDTH PLURAL SPOT VIDEO PROCESSOR

FIELD OF THE INVENTION

The instant invention is directed to the field of electrooptics, and more particularly, to a novel high bandwidth plural spot video processor.

BACKGROUND OF THE INVENTION

Optical measurement systems are often embedded in other systems, such as mechanical and electrical systems, with which they cooperate to provide an intended function or subfunction. The optical systems are thus subject to a variety of disturbances arising from the equipment in which they are embedded or with which they are cooperative. In order to make high quality measurements, such as for the optical measurement system aboard a spacecraft, the bandwidth of the measurement must be, as a rule of thumb, on the order of twenty times the bandwidth of the disturbances to which the optical system is subjected. For some typical high accuracy applications, the bandwidth of the disturbance may be approximately 150 hertz, so that the measurement bandwidth must be on the order of 3,000 hertz or more. Optical measurement systems must in these and other instances be operative at the corresponding bandwidth to avoid and reduce disturbance contamination.

In some optical systems, one or more elements are monitored to provide an intended control or other action. The elements may be of the optical system or of the one or more systems in which the optical system is embedded. It therefore becomes essential that a multiple spot processing capability capable of simultaneously monitoring multiple system components and processing the data representative of the components is provided.

A real-time processing system capability, where measurements are made as often as critical events occur, and control action appropriate to the change in conditions is executed, is also desireable in some instances. Furthermore, it is often necessary to be able to run in a mode other than a real-time mode to be able to accomplish special requirements that the system may dictate, such as the ability to selectably run one or more computationally intensive control algorithms. Optical measurement systems should therefore have as well a multiple mode processing capability.

SUMMARY OF THE INVENTION

In accordance with one object of the present invention, there is disclosed a high bandwidth photoarray processing system, which, in the preferred embodiment, includes a data processing capability at a 3.2 kilohertz frame rate, which capability corresponds to a disturbance bandwidth over 160 hertz, so that the system of the invention is well adapted to high precision environments such as those found in spacecraft applications. Electronics are disclosed for enabling high-speed serial data read-out of a RETICON mosaic photosensor array, which electronics in the preferred RETICON embodiment include high-speed threshold amplifiers and TTL amplifiers. A dual memory buffer synchronized with the frame rate is provided for alternately storing frames of RETICON data in a different one of first and second buffer memories. Data is always available in one of the buffer memories, so that processing may proceed in real-time without having to wait for data writes.

In accordance with a further object of the present invention, there is disclosed a multi-mode processing capability, which, in the preferred embodiment, includes one or more processors connected to the dual memory buffer via a high speed bus. Operation of the one or more processors includes operation in a real-time mode and in a special processing mode. In the real-time mode, the one or more processors are operative to read the data from each buffer memory as the current frame data is written into the other buffer memory. The one or more processors in the real-time mode are operative to compute one or more control algorithms on the data time synchronously with the RETICON frame rate. In the special processing mode, the one or more processors are operative to calculate on a given frame of data algorithms that require longer than a frame cycle to complete. In the special processing mode, the one or more processors and the RETICON photoarray are asynchronously coupled, whereby new frame data is written over the existing frame data until exiting the special processing mode. A buffer control is disclosed responsive to the state of the RETICON array and to the state of the one or more processors for enabling data transfer in either the real-time or the special-processing modes.

In accordance with a further object of the present invention, there is disclosed a plural spot processing system, which, in the preferred embodiment, includes processing flow and control algorithms for locating and tracking in each frame the data representative of plural spots in the input 2-D spatial light input beam.

In an exemplary embodiment, processing in the special-processing mode has disclosed utility in acquiring via a windowing function the spots one at a time from the RETICON frame data. Processing in the real-time processing mode has disclosed utility in tracking the several centroids of the acquired spots and in generating appropriate control signals in response to the changing positions of the spot centroids. The invention has utility in many optical measurement and control systems, including alignment and boresight applications, surveillance and tracking applications, directed energy weapons applications, and in astronomy, among others.

BRIEF DESCRIPTION OF THE DRAWINGS

These and other objects, aspects and features of the present invention will become apparent as the invention becomes better understood by reference to the following detailed description thereof and by reference to the drawings, wherein.

DETAILED DESCRIPTION OF THE INVENTION

Figure 1:
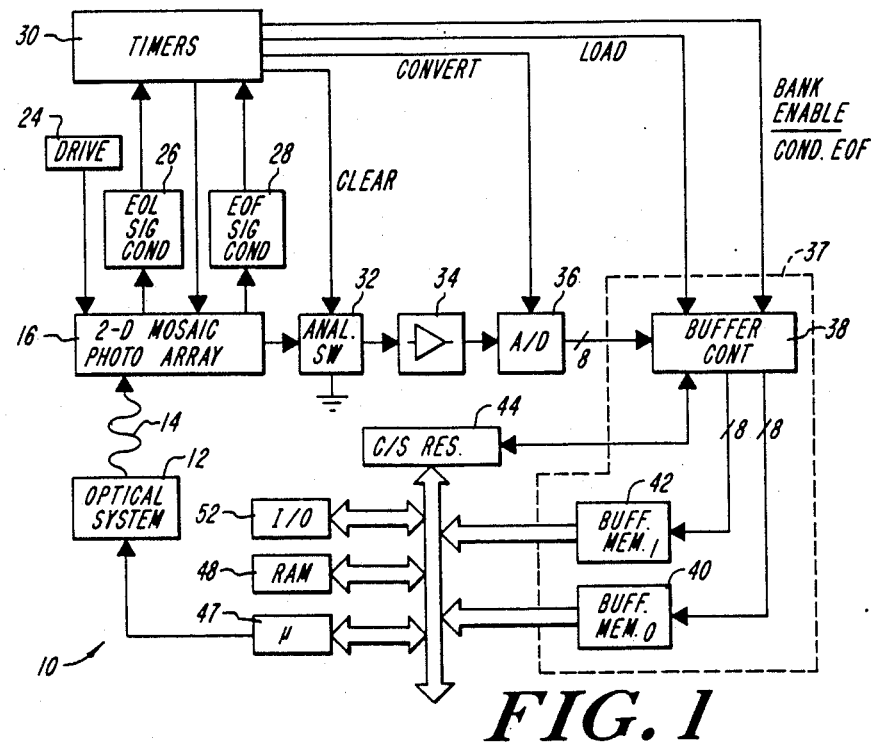
FIG. 1 is a block diagram illustrating an exemplary embodiment of the high bandwidth plural spot video processor of the present invention.
Figure 2A:
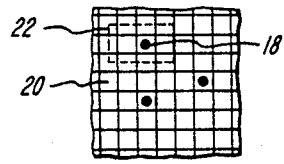
FIG. 2 shows in FIGS. 2A and 2B thereof sensor plan diagrams illustrating the multiple spot handling capability according to the present invention.

Referring now to FIG. 1, generally designated at 10 is a block diagram illustrating the novel high bandwidth plural spot video processor according to the present invention. The system 10 has exemplary utility in a closed loop feedback control system 12, which may include a laser and several mirrors in the optical chain of the laser, not shown. Reference may be had to copending United States utility patent applications Ser. No. 792,128 entitled Limited Diffraction Feedback Laser System and to Ser. No. 927,266 entitled Ballistic Missle Tracking System and Method, both incorporated herein by reference, for exemplary closed loop feedback control system application environments. As will readily be appreciated by those skilled in the art, the one or more elements to be controlled by operation of the control system are represented as optical parameters, usually coherent or incoherent images of the one or more elements to be controlled. The optical parameters typically are in the form of "spots", finite patterns of optical energy having sizes and positions representative of the orientation, focus and other conditions etc of the one or more controlled elements. The spots produced by the optical system are schematically illustrated in FIG. 1 by an optical energy beam 14. The beam 14 is incident on a two-dimensional photoarray 16, such as a RETICON array, consisting of plural rows and columns of discrete, photoresponsive picture elements or pixels. As seen in FIG. 2A, the beam 14 has a two dimensional spatial intensity distribution that includes plural spots 18, each representative of the spatial orientation or other feature of the one or more controlled elements of the optical system 12. In the preferred embodiment, the RETICON array includes a thirty-two (32) by thirty-two (32) array of one thousand twenty four (1,024) pixels 20. The position and size etc. of the spots 18 with respect to the array position of the pixels 20 are representative of the state of the one or more controlled parameters of the optical system 12. The present invention is able to very quickly determine the centroid location of each of he multiple spots 18 achieving in the preferred embodiment approximately a thirty two hundred (3,200) frames per second temporal bandwidth. Control decisions can thereby be updated approximately every thirty (30) milliseconds in the realtime processing mode to be described. The centroid processing measurement bandwidth corresponds to approximately a one hundred sixty (160) hertz disturbance bandwidth, so that the present invention is thereby capable of being deployed on optical platforms, such as spacecrafts, requiring precise pointing and tracking.

Figure 2B:
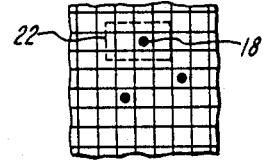

In the real-time processing mode as appears more fully below, a region of a predetermined size is defined around a spot as illustrated by a dashed box 22, and the dynamic characteristics of the spots, which are representative of change in the state of the corresponding physical elements of the control system, are determined by the data enclosed by the windows 22 as the spots 18 move as illustrated in FIG. 2B. Only the data enclosed within the windows is taken account of, so that the remaining interwindow information is thus able to be temporarily neglected, which results in an enhancement of the speed performance characteristic of the array. For example, four five-by-five windows, occupy 100 pixels, one tenth of the total in the exemplary array. Having therefore to only read one tenth of the pixels enhances processing performance by an order of magnitude. A further feature of the windowing aspect, insofar as the windowing delimits particular sensor regions traveling with and dedicated to each spot, which are kept separate from each other, is that three (3), four (4) and more spots can readily be monitored and controlled via one and the same sensor. In addition, the windows can track high amplitude low frequency motion of the spots, thus maintaining the speed performance characteristics for moving spots.

The RETICON two-dimensional photoarray 16 of the preferred embodiment includes plural integrating capacitive elements associated with the several light responsive pixels in well known manner. The two-dimensional intensity distribution of the input beam 14 produces charge in the corresponding pixels having a magnitude that is proportional to the local time-magnitude intensity of the input beam. Drive electronics 24 well known to those skilled in the art provide a raster scan output of the individual pixels of the array 16 in such a way that as the elements are sequentially read row by row, the array produces an analog output signal having an intensity proportional to the incident light, produces an end of line (EOL) signal after each row of the array is scanned, and produces an end of frame (EOF) signal after all of the rows have been scanned. The drive electronics 24 includes a clock, of a selectable and variable clock frequency, for setting the RETICON pixel, EOL, and EOF scan rates.

The EOL and EOF signals control the conversion of the video output signal for each pixel into the digital values corresponding thereto, control the writing of the digital values into a frame buffer memory, and provide state information. The EOL and EOF signals are conditioned in analog signal conditioning circuitry 26, 28 to be described in order to improve the accuracy and the speed with which the EOL and EOF timing signals are generated. Although in the preferred embodiment the array is serially read until all of the pixels of the rows and columns have been read out, operation of the array in a random address mode is also possible, without departing from the inventive concept.

Timers 30 responsive to the clock and to the EOL and EOF signals are operative to produce CLEAR, CONVERT, LOAD, and BANK ENABLE signals. The CLEAR signal controls a sample and hold device to be described, which samples the video output signal of the array synchronously with the read out of each of the pixels of the array, and holds it for A/D conversion. The CONVERT signal controls an analog to digital converter to be described, which converts the sampled and held video signal into its corresponding digital value. The LOAD signal controls a memory address controller to be described of the dual memory buffer so that each digital value of the data stream is written to a predetermined memory address dedicated to the pixel of the array corresponding thereto. The BANK ENABLE signal controls a memory select controller to be described of the dual memory buffer to write the data to one of two memory banks to be described. The LOAD signal cooperates with the BANK ENABLE signal so that the serial digital data stream is written as frame data in the selected memory in such a way that the spatial intensity distribution of the input light beam on the array is reproduced as a global block of memory synchronously at the processing frame rate.

The video output of the mosaic array 16 is connected to a sample and hold device preferably in the form of an analog switch 32. The switch 32 samples the video signal for each pixel, and holds it until the analog switch 32 is discharged to ground by the CLEAR signal. Of course, other sample and hold devices can be employed as well without departing from the inventive concept, but in the preferred embodiment, the switch 32 includes matched FET's in a differential FET amplifier configuration. A CLEAR signal gated FET is connect to ground. The differential FET amplifier has a high input impedance and a capacitive load matched to that of the RETICON array.

An amplifier 34 is connected to the output of the sample and hold 32. The amplifier 34 amplifies the sampled and held video signal, and converts it to the impedance required for effective A/D conversion. In the preferred embodiment, where the RETICON array is used, the output from the sample and hold drives a matched NPN transistor pair configured as a common emitter amplifier to provide voltage and current gain, and a very fast operational amplifier, with an emitter follower in its feedback loop to provide high currents, is preferably coupled to the output of the emitter follower amplifier.

An analog to digital converter 36 is connected to the output of the amplifier 34. Although any suitable A/D converter is usable, preferrably a TRW TDC1007 parallel flash converter, having a 7.8 millivolt resolution and a high sample rate of 30 MSPS, is used to convert the amplified video signal intensity into its corresponding eight bit digital representation. The converter 36 is synchronized with the video signal by the CONVERT signal, so that upon each assertion thereof, the A/D converter is operative to produce a digital value corresponding to the charge on the capacitor connected to the particular pixel of the mosaic array then being read.

A dual memory buffer represented by a dashed box 37 is connected to the output of the analog to digital converter 36. The dual memory buffer includes a buffer controller 38, and two banks of RAM memory 40,42 designated as "BUFF MEM$_0$" and "BUFF MEM$_1$". A command and status register 44 to be described is connected to the buffer controller 38. The buffer controller 38 is operative in response to the BANK ENABLE signal, the state of the command and status register 44, and to the LOAD signal to write the digital data stream produced by the analog to digital converter 36 as a block of frame data in one of the two banks of RAM buffer memory 40, 42. A processor 47 is connected to the buffer memories 40, 42 via an address and data bus. The RAM memories 40, 42 are connected as global memory to the processor 47 via the bus, and occupy the same addresses in the processors memory map.

The buffer controller 38 and processor 47 interact via the command and status register 44 and implement a handshaking communications protocol to be described to provide operation in one of a special processing mode and a real-time processing mode. In the real-time processing mode, the processor 47 is operative synchronously with the frame rate to read preselected data from a frame of data from one bank of RAM memory, and to perform preselected operations thereon while the RETICON writes data to the other bank of RAM memory. In the special processing mode, the processor 47 is operative asynchronously with the frame rate to read a block of data from one RAM memory bank and to compute special control or other algorithms on that data that takes more time to compute than the frame interval while the data from the RETICON is synchronously read into the other bank of RAM memory synchronously with the frame rate. One or more additional processors, not shown, can readily be connected to the bus to share processing loads, or for other purposes. In the preferred embodiment, a processor of the MC68000 processor family marketed by the Motorola Company and a high-speed high-flexibility "VME" bus architecture are provided, although any other suitable processor and bus are selectable without departing from the inventive concept.

Figure 3:
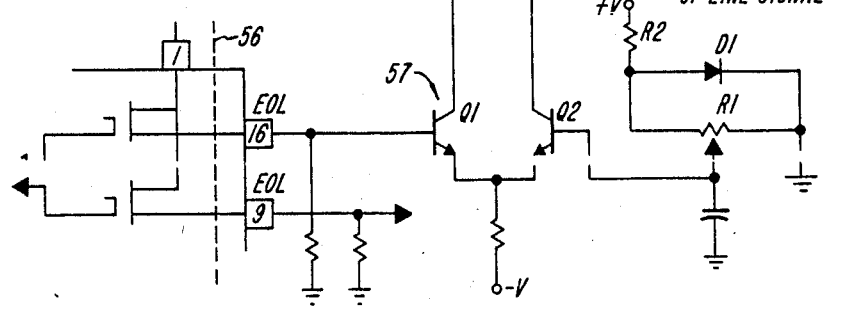
FIG. 3 is a schematic diagram illustrating the speed-up electronics for the RETICON array according to the present invention.

Referring now to FIG. 3, generally designated at 54 is a schematic diagram illustrating a preferred embodiment of the end of line signal conditioning electronics according to the present invention. The end of line signal conditioning electronics 54 is operative to render more definite the transition characteristics of the end of line pulse produced by the array 16 (FIG. 1) to better provide for accurate and fast timing control. Behind and to the left of a vertical dashed line 56 is represented an output FET transistor of the end of line output (EOL) and end of frame (EOF) output of the RETICON array, which are available at the pins 16 and 9 thereof. The output of the pin 16 is connected to a very fast emitter coupled pair of NPN transistors $Q_1$, $Q_2$ generally designated 57. The amplifier 57 provides a sharp turn-off threshold that improves the fall time of the EOL signal and provides amplification to TTL levels. A variable resistor $R_1$ connected in the base of the output transistor of the emitter coupled transistor amplifier 57 is provided to adjust the minimum pulse width of the end of line signal. The rising edge of the EOF signal is used for timing, unlike the trailing edge in the case of the end of line signal, so that a simple emitter follower and TTL Schmitt trigger amplifier provide TTL conversion for the EOF signal.

Figures 4, 5:
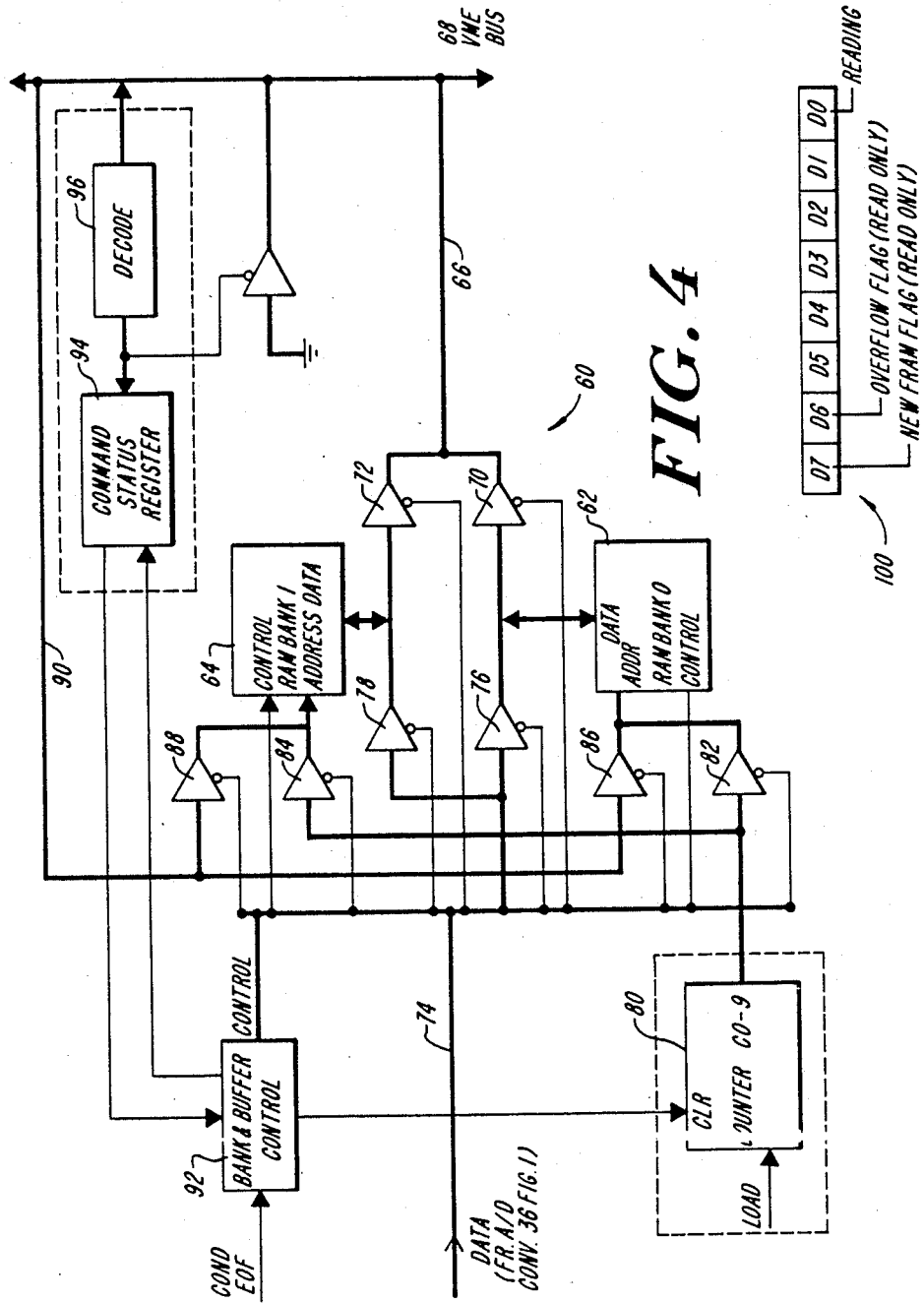
FIG. 4 is a schematic diagram illustrating the dual memory buffer according to the present invention.
FIG. 5 is a bit field diagram useful in explaining a handshaking protocol between the one or more processors and the dual memory buffer.

Referring now to FIG. 4, generally designated at 60 is a schematic circuit diagram illustrating the buffer controller of the present invention. Memory buffer RAM bank 62 and memory buffer RAM bank 64 are connected to the data lines 66 of system bus 68 via tristate buffers 70, 72, and are connected to data output lines 74 of the analog to digital converter 36 of FIG. 1 via tristate buffers 76, 78. The tristate buffers 70, 72, 76, 78 control data transfer into and out of the RAM banks 62, 64.

When one of the buffers 70, 72 is enabled, the other is disabled, so that data is able to be read over the bus 66 from only one of the RAM banks. Whenever one of the buffers 70, 72 is enabled, the corresponding buffer 76, 78 is disabled, which prevents the data on the line 74 from passing therethrough and onto the data lines of the VME bus 68. In the real-time processing mode, the tristate buffers located on the diagonals, 70, 78; 72, 76, are alternately enabled and disabled in pairs, such that as the data from one of the RAM banks is available on the bus 66, for processing by the processor, data is being made available and written into the other of the RAM banks via the data lines 74, therewith preventing possible erroneous data reads and writes.

A counter 80 is connected to the address inputs of the RAM banks 62, 64 via tristate buffers 82 and 84. The counter 80 is operative to produce addresses to the enabled one of the RAM banks for specifying thereby the location at which the corresponding digital value of the stream of digital values produced by the A/D converter is stored. The write addresses are made available to one RAM bank at a time, so that when one of the tristate buffers 82, 84 is enabled, the other of the tristate buffers is disabled.

The address inputs of the RAM banks 62, 64 are also connected via tristate buffers 86, 88 to the address lines 90 of the VME bus 68. If one of the tristate buffers 86, 88 is enabled, the other of the tristate buffers is disabled, so that the addresses appearing on the address bus 90 are made available to only one of the RAM banks 62, 64, whereby the processor is able to read the data at the corresponding addresses of that RAM bank over the data lines 66 of the bus 68. As the addresses are being produced by the processor in the read mode over the address lines 90, the corresponding tristate buffer is enabled. For example, during the processor read mode, if the tristate buffer 88 is enabled, the tristate buffer 86 is disabled, whereby addresses produced by the processor are available only from the bank 64 but not from the bank 62. During this time, the tristate buffer 72 is enabled and the tristate buffer 70 is disabled, whereby data at the addresses produced over the address line for the bank 64 is made available over the data bus 66 to the processor, but not for the bank 62. Conversely, during the processor read mode for the bank 62, whenever the tristate buffer 86 is enabled, the tristate buffer 88 is disabled, and the bank 62 produces the corresponding data on the data lines thereof, which pass through the enabled tristate buffer 70 onto the bus. The buffer 72 in this latter case, of course, is disabled.

During data write, which is always ongoing synchronously at the selected data frame rate, data is transferred from the data lines 74 into a selected RAM bank via the buffers 82, 84, which are exclusively enabled. The counter 80 provides the appropriate addresses on the corresponding RAM bank, while the buffer 76, 78 corresponding to that bank is exclusively enabled vis a vis the other. With each address produced by the counter 80, the digital value on the data lines 74 is passed through the correspondingly enabled tristate buffer into the enabled RAM bank.

Data reads and writes may be accomplished at the same time. While data for one frame is written into one of the RAM banks, data already having been written to the other RAM bank from the prior cycle is read by the processor. The process may continue alternately to provide real-time processing synchronously with the frame rate. The RAM banks 62, 64 each have identical addresses in the global memory space of the processor. A bank controller is provided for physically switching the banks 62, 64 onto and off of the buses 74, 66 to allow simultaneous reads and writes. The bank controller 92 is connected to and controls the tristate buffers 70, 72, 76, 78, 82, 84, 86, 88 in response to the state of the command and status register 94 and in response to the conditioned EOF signal. The register 94, connected to the bank control 92, is coupled to the VME processor bus 68 via an address decoder 96.

Referring now to FIG. 5, generally designated at 100 is a pictorial diagram illustrating the bit field of the command and status register 44 (FIG. 1). The register includes 8 bits marked $D_0$ through $D_7$. The first bit $D_0$ of the bit field defines a reading flag, the sixth bit $D_6$ of the bit field defines an overflow flag, and the seventh bit $D_7$ defines a new frame flag. The $D_0$ bit is set by the processor. The state of the $D_0$ bit represents whether the processor is presently reading the frame data available in one of the RAM banks 62, 64. The bank control 92 monitors the state of this bit, and does not enable RAM bank switching so long as the processor is reading one of the banks. So long as the $D_0$ bit indicates usage of a bank by the processor, the bank control will not switch between the banks, even if a new frame becomes available. In this latter event, the prior frame will be written over by the new frame in the bank of RAM that is not being read by the processor.

The $D_6$ bit is set by the bank control 92 in the event that the processor "misses" a frame of data, such as when it is operating in the special processing mode. The state of the $D_6$ bit is monitored by the processor, which alerts the processor that the overflow condition has occurred for one or more frames of data.

The $D_7$ bit field is set by the bank controller 92, and it represents whether and when a new and complete frame of data has been written into one of the RAM banks. The state of the $D_7$ bit indicates to the processor a valid frame has been newly stored into one of the banks, and that that frame is ready to be operated upon. Typically, the processor monitors this bit of the bit field to determine when it can start calculations on a new frame of data. The new frame flag is cleared on a transition of the reading flag. The overflow flag is cleared on a transition of the reading flag. The reading flag is cleared by the processor after it is finished with the frame data.

Figure 6:
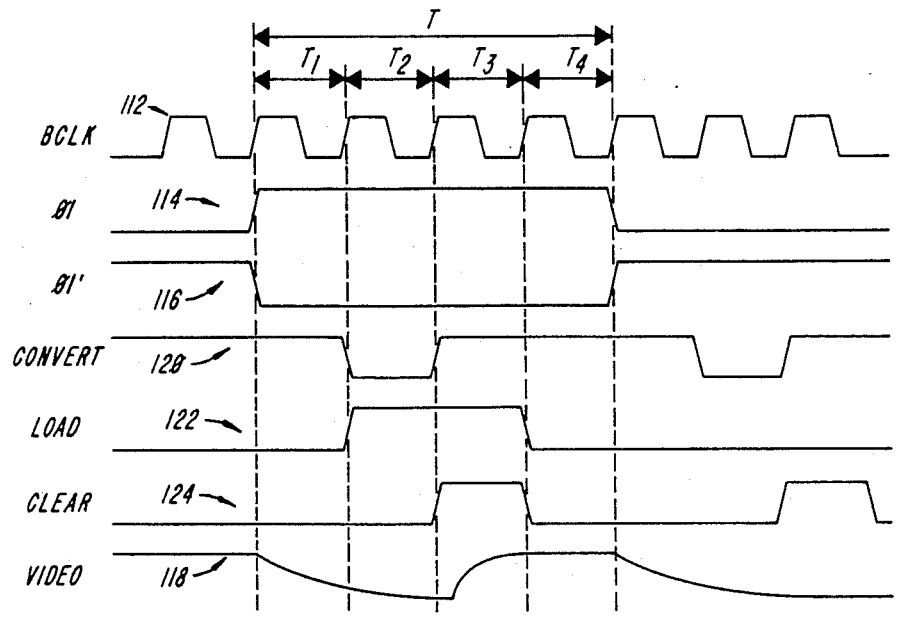
FIG. 6 shows timing graphs useful in explaining the way the way video signal from the array is framewise converted into a digital data stream.

Referring now to FIG. 6, generally designated at 110 are graphs useful in explaining the way the multiple spot processing system of the invention is operative to write the information representative of the two-dimensional spatial intensity distribution on the photoarray into each one of the RAM memory banks synchronously with the frame rate. The basic clock frequency is shown by a waveform 112. As is indicated by an arrow marked "T", the basic clock frequency is at a frequency that is four times the frequency of the RETICON pixel scan frequency, designated by the waveforms 114, 116 and marked 01, 01'. The basic processing sequence for each pixel of the mosaic array is separated into four subintervals, during the first of which, marked "$T_1$", the video output signal generally designated 118 on the output line of the RETICON array expresses itself. At the falling edge of the CONVERT signal generally designated 120, the analog to digital converter is enabled to sample the analog value and to produce data representative thereof during the subinterval designated "$T_2$". The LOAD signal generally designated 122 is asserted during the second and third subintervals. The LOAD signal advances the counter 80 (FIG. 4) to produce the next address to which the data value appearing on the line 74 (FIG. 4) at the output of the A/D converter is written in the write enabled one of the RAM banks. As shown by the signal waveform generally designated 124, during the third subinterval designated "$T_3$", the CLEAR signal is asserted, which grounds the video output signal thereby clearing the sample and hold device. During the fourth period designated "$T_4$", the sample and hold and the analog to digital converter are allowed to settle. The above described process is repeated for each of the pixels of the array. In the preferred embodiment, the clock frequencies although selectable once they are set the pixels are each surveyed synchronously, pixel to pixel, and frame to frame, so that the time/charge characteristics of the several pixels remain invariant pixel to pixel to provide uniform processing. At the end of each frame of data, the conditioned end of frame signal is asserted, which, depending on the state of the bit field of the command/status register, causes the bank controller 92 (FIG. 4) to toggle to the other bank of the dual memory buffer.

Figure 7:
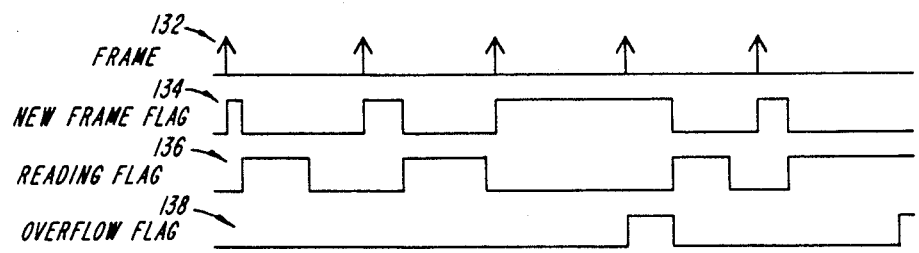
FIG. 7 shows timing graphs useful in explaining the handshaking protocol.

Referring now to FIG. 7, generally designated at 130 are timing graphs useful in explaining the handshaking protocol that establishes and controls the communication between the processor and the bank control. As shown by a graph generally designated 132, upstanding arrows represent the synchronous cycling operation of the array data frame-to-frame. At each time designated by a vertical arrow, another frame of data is made available. The data is either read by the processor and operated on synchronously with the frame data or it is read by the processor and operated on for a time greater than the frame interval. As shown by a graph generally designated 134, immediately upon the availability of each frame of data, the new frame flag is set, as indicated by the rising edge of the pulses of the new frame flag waveform 134. As shown by a graph 136, the reading flag is set when each frame is read by the processor, which de-asserts the corresponding new frame flag. So long as the processing time interval is less than the frame time interval, the data is processed synchronously with the frame data. But, if the processing time interval is greater than the frame time interval, as shown by the third pulse of the new frame flag graph 134, an overflow flag is set, as shown by the first pulse of a graph generally designated 138, which is de-asserted as soon as the processor initiates a data read. During this interval, the new frame data is written over the old data in the same RAM bank, and the overflow flag indicates to the processor the condition of overflow. The processor is operative both synchronously to read the frame data and execute predetermined control algorithms during the frame interval, as well as is operative asynchronously, to process a data frame over an interval longer than the frame cycle. In the preferred embodiment, the processor is operative in the synchronous processing mode to monitor the centroid and position changes of already acquired spots to provide real-time closed loop feedback control, and is operative in the special processing mode to acquire each of the spots of the plural input spots and to define windows therearound asynchronously with frame data generation.

Figure 8:
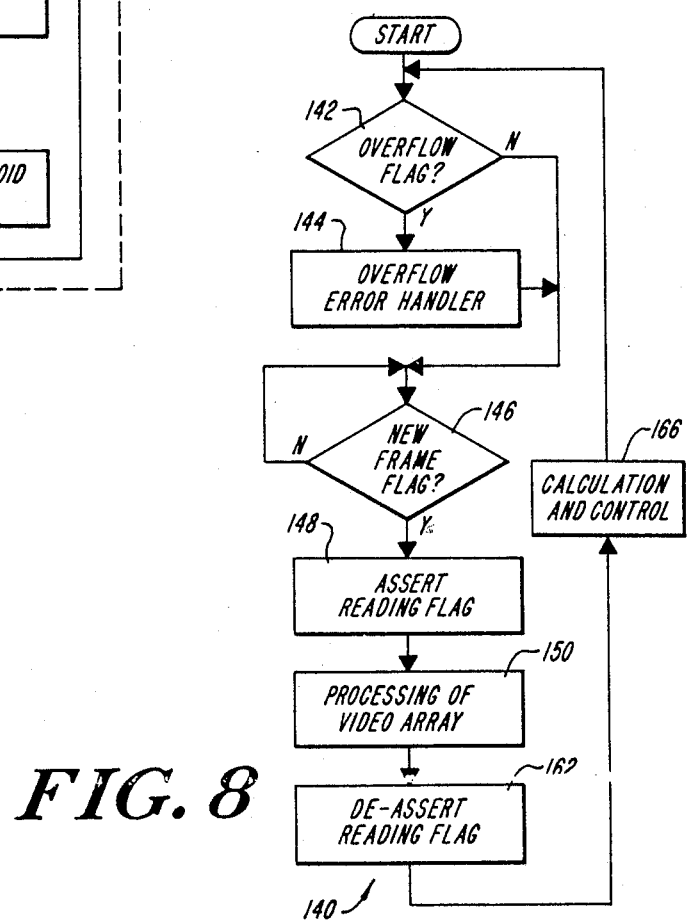
FIG. 8 is a flow chart illustrating operation of the high bandwidth plural spot video processor according to the instant invention.

Referring now to FIG. 8, generally designated at 140 is a flow chart illustrating the presently preferred processing sequence of the exemplary embodiment of the high bandwidth plural spot video processor of the present invention. As shown by a block 142, the processor is operative to determine whether the overflow flag is asserted. If the overflow flag is asserted, the processor executes an overflow error handler routine as shown by a block 144. As shown by a block 146, after the overflow error handler has been executed or if no overflow flag is asserted, the processor waits until the new frame flag is asserted.

If the new frame flag is asserted, the processor is operative to assert the reading flag, as shown by a block 148, and to read the data out of buffer RAM.

Figure 9:
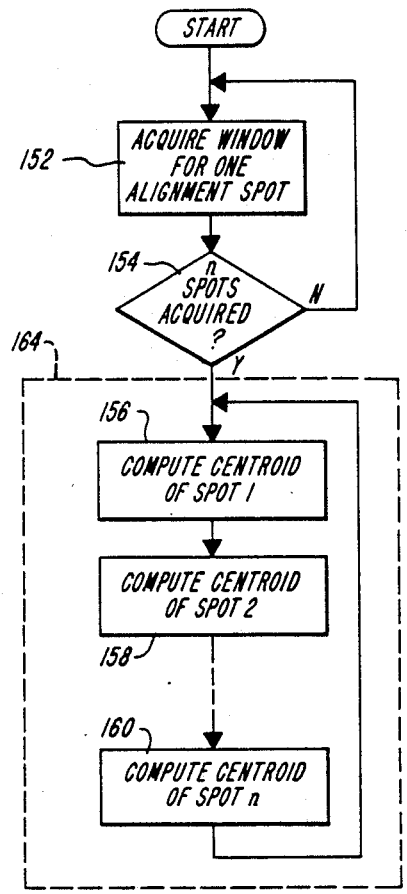
FIG. 9 is a flow chart illustrating the operation of the presently preferred embodiment of the high bandwidth plural spot photoarray video processor in accordance with the present invention.

As shown by a block 150, the processor is then operative to process the frame of video array data. Processing in the preferred embodiment is in one of a real-time spot tracking mode and an asynchronous spot acquiring mode. FIG. 9 illustrates the several functions in the exemplary optical processing system. In the asynchronous mode, the processor is operative as shown by a block 162 to acquire the window for the alignment spot that is the brightest spot in the photoarray. The processor searches the data to locate that value which corresponds to the brightest pixel, and surrounds it with a square window of a preselected size, preferably five pixels on a side. The processor then stores the addresses for the data enclosed by that window, and deletes it from the memory space. The processor then proceeds by locating the value corresponding to the next most intense spot in the data array, repeats the window surrounding operation for that spot, and deletes that data again from the further memory search space. The process is repeated until all the plural spots are acquired as shown by a block 154. As shown by a block 156, after all the n spots are acquired, the processor is operative to compute the location of the centroid of the first spot in the window of data corresponding thereto. As shown by a block 158, the processor is operative to compute the centroid of the second spot in the corresponding second data window. The process is continued until the processor computes the centroid location for the nth spot as shown by a block 160, and then processing returns.

As shown by a block 162, after processing of each frame of the video array data, the processor is operative to de-assert the reading flag, which enables the bank control to toggle to the other RAM bank to make the next frame of data already stored in the physically different RAM bank available for the processor immediately during the next frame cycle and at the same processor address space. After spot acquisition, the bandwidth is such that in many applications the spots do not move more than a single pixel in the frame interval. In the exemplary application, such movements correspond to high frequency low amplitude spots movement induced by atmospheric changes. The processor then for the next data frame need not re-acquire the windows for the spots, the windows span an area in the buffer memory sufficiently large to include the new position of the spots. The processor then need only calculate the centroids for the data corresponding to the data enclosed by the several windows, as illustrated by the processing steps included in a dashed box 164 in FIG. 9, but not re-acquire the spots. The bandwidth and processing throughput of the processor are thereby improved. In the exemplary application, low frequency high amplitude spot movement, such as induced by pointing and tracking, may require window reacquisition. This happens, for instance, when the control action causes the centroids of the spots to so move as to no longer be centered in their five-by-five windows. After window reacquisition, processing can return to the real-time mode. In the exemplary five by five pixel windows, if the spot centroid moves less than three pixels, the window may be repositioned in the real-time mode without requiring spot reacquisition or processing in the special processing mode.

As shown by a block 166, the processor is then operative to perform the calculations that implement the closed loop control at algorithms that correspond to the particular application.

What is claimed is:

1. A high bandwidth plural spot video processor, comprising:

means including a photoarray for providing a digital data stream in accordance with a preselected frame rate representative of an intensity distribution of a light signal incident on the surface of the photoarray;

a first memory selectively coupled to said digital data stream via a buffer control means, said first memory being adapted for storing said digital data stream in synchronism with said preselected frame rate at individual address locations of the first memory;

a second memory selectively coupled to said digital data stream via said buffer control means, said second memory being adapted for storing said digital data stream in synchronism with said preselected frame rate at individual address locations of the second memory;

an electronic processor having an address space;

means coupled to said digital data stream providing means, and to said processor, wherein said buffer control means are adapted for controllably switching said first and said second memories to connect one of them to the processor while the other of them is connected to the data stream providing means, and to connect the other of them to the processor while said one of them is connected to the data stream providing means to thereby simultaneously read data from the memory connected to the processor while data is written to the memory connected to the data stream providing means;

means responsive to data from the one of said first memory and said second memory connected to the processor for storing data having a predetermined correspondence at the same address locations in said address space for each frame of digital data; and input output means responsive to data in said address space; said photoarray includes a mosaic array having an end of line pulse signal having a trailing edge and a fall time, and further including means for improving the sharpness of the trailing edge and thereby the fall time of the end of line pulse signal.

2. The high bandwidth plural spot video processor of claim 1, further comprising one or more processors to help said electronic processor with processing tasks.

3. A high bandwidth plural spot video processor, comprising:

means including a photoarray for providing a digital data stream in accordance with a preselected frame rate representative of an intensity distribution of a signal incident on the surface of the photoarray;

a first memory selectively coupled to said digital data stream via a buffer control means, said first memory being adapted for storing said digital data stream in synchronism with said preselected frame rate at individual address locations of the first memory;

a second memory selectively coupled to said digital data stream via said buffer control means, said second memory being adapted for storing said digital data stream in synchronism with said preselected frame rate at individual address locations of the second memory;

an electronic processor having an address space;

means coupled to said digital data stream providing means, and to said processor, wherein said buffer control means are adapted for controllably switching said first and said second memories to connect one of them to the processor while the other of them is connected to the data stream providing means, and to connect the other of them to the processor while said one of them is connected to the data stream providing means to thereby simultaneously read data from the memory connected to the processor while data is written to the memory connected to the data stream providing means;

means responsive to data from the one of said first memory and said second memory connected to the processor for storing data having a predetermined correspondence at the same address locations in said address space for each frame of digital data; and input output means responsive to data in said address space;

wherein said photoarray is a mosaic array having an end of line pulse signal having a trailing edge and a fall time, and further including means for improving the sharpness of the trailing edge and thereby the fall time of the end of line pulse signal;

wherein said array is a mosaic array having a video output line, and wherein said digital signal providing means includes an analog to digital converter coupled to the output line of the mosaic array via an impedance matching buffer amplifier.

4. A high bandwidth plural spot video processor, comprising:

means including a photoarray for providing a digital data stream in accordance with a preselected frame rate representative of an intensity distribution of a light signal incident on the surface of the photoarray;

a first memory selectively coupled to said digital data stream via a buffer control means, said first memory being adapted for storing said digital data stream in synchronism with said preselected frame rate at individual address locations of the first memory;

a second memory selectively coupled to said digital data stream via said buffer control means, said second memory being adapted for storing said digital data stream in synchronism with said preselected frame rate at individual address locations of the second memory;

an electronic processor having an address space;

means coupled to said digital data stream providing means, and to said processor, wherein said buffer control means are adapted for controllably switching said first and said second memories to connect one of them to the processor while the other of them is connected to the data stream providing means, and to connect the other of them to the processor while said one of them is connected to the data stream providing means to thereby simultaneously read data from the memory connected to the processor while data is written to the memory connected to the data stream providing means;

means responsive to data from the one of said first memory and said second memory connected to the processor for storing data having a predetermined correspondence at the same address locations in said address space for each frame of digital data; and input output means responsive to data in said address space;

wherein said photoarray is a mosaic array having an end of line pulse signal having a trailing edge and a fall time, and further including means for improving the sharpness of the trailing edge and thereby the fall time of the end of line pulse signal; and wherein said mosaic array includes a two-dimensional array of pixels and means operative to provide a pixel scan signal, and further including means responsive to the pixel scan signal to provide addresses at which the data is stored in the first and second memories.

5. The invention of claim 4, wherein said first and second memories are RAM banks having address ports, and wherein said address providing means includes a counter connected to the first and second memory address ports and responsive to the pixel scan signal.

6. The invention of claim 5, wherein said counter has a clear port, and further including means coupled to the counter for clearing said counter clear port synchronously with said preselected frequency.

7. A high bandwidth plural spot video processor, comprising:
    means including a photoarray for providing a digital data stream in accordance with a preselected frame rate representative of an intensity distribution of a light signal incident on the surface of the photoarray;
    a first memory selectively coupled to said digital data stream via a buffer control means, said first memory being adapted for storing said digital data stream in synchronism with said preselected frame rate at individual address locations of the first memory;
    a second memory selectively coupled to said digital data stream via said buffer control means, said second memory being adapted for storing said digital data stream in synchronism with said preselected frame rate at individual address locations of the second memory;
    an electronic processor having an address space;
    means coupled to said digital data stream providing means, and to said processor, wherein said buffer control means are adapted for controllably switching said first and said second memories to connect one of them to the processor while the other of them is connected to the data stream providing means, and to connect the other of them to the processor while said one of them is connected to the data stream providing means to thereby simultaneously read data from the memory connected to the processor while data is written to the memory connected to the data stream providing means;
    means responsive to data from the one of said first memory and said second memory connected to the processor for storing data having a predetermined correspondence at the same address locations in said address space for each frame of digital data; and
    input output means responsive to data in said address space;
    wherein said processor has read and processing states and said switching means includes means for indicating the status of the memories with respect to the phase of the data stream with regard to a frame of data, and with respect to the read and processing states of the processor.

8. A high bandwidth plural spot video processor, comprising:
    means including a photoarray for providing a digital data stream in accordance with a preselected frame rate representative of an intensity distribution of a light signal incident on the surface of the photoarray;
    a first memory selectively coupled to said digital data stream via a buffer control means, said first memory being adapted for storing said digital data stream in synchronism with said preselected frame rate at individual address locations of the first memory;
    a second memory selectively coupled to said digital data stream via said buffer control means, said second memory being adapted for storing said digital data stream in synchronism with said preselected frame rate at individual address locations of the second memory;
    an electronic processor having an address space;
    means coupled to said digital data stream providing means, and to said processor, wherein said buffer control means are adapted for controllably switching said first and said second memories to connect one of them to the processor while the other of them is connected to the data stream providing means, and to connect the other of them to the processor while said one of them is connected to the data stream providing means to thereby simultaneously read data from the memory connected to the processor while data is written to the memory connected to the data stream providing means;
    means responsive to data from the one of said first memory and said second memory connected to the processor for storing data having a predetermined correspondence at the same address locations in said address space for each frame of digital data; and
    input output means responsive to data in said address space;
    wherein plural spots are present on the photoarray, said spots having dimensions less than the overall dimensions of the array, and further including means cooperative with said processor to produce windows surrounding the spots and to eliminate interwindow array data.

9. A high bandwidth multi-mode video processor comprising:
    a digital camera including a photoarray for providing digital data frames representative of spatial intensity distribution of input light incident on the photoarray synchronously at a selectable frame frequency;
    storing means including a memory coupled to the digital camera for storing said data frames in the memory synchronously at said selectable frame frequency;
    processing means for computing selectable algorithms on said data frames;
    means for providing a real-time processing mode, and coupled to said processing means and to said storing means, where the data frames are processed at a frequency synchronous with the frame frequency such that the processing means are operative to read and process a first data frame from a first memory in said storing means, while a second data frame is written to a second memory in said storing means; and means for providing a special processing mode where the data frames are processed at a frequency less than and asynchronous with the frame frequency such that processing in the special mode preempts processing in the real-time mode, and such that the processing means are operative to read and process a first data frame, from a first memory in said storing means, for a period greater than a frame cycle, while a series of subsequent data frames are written to a second memory in said storing means, each individual data frame overwriting any previous data frame.

10. The invention of claim 9, wherein said memory includes first and second memories, and further including means coupled to the first and second memories, to said processing means, and to said processing mode providing means for writing a frame of data to one of said first and second memories while reading a frame of data from the other of the first and second memories in said real-time processing mode.

11. The invention of claim 9, wherein said processing mode providing means includes means operative during said special processing mode to write data frames over each other in the memory for so long as the processing means is operating in the special mode.

12. The invention of claim 9, wherein said video processor is operative in the real-time processing mode to track the movement of optical spots.

13. The invention of claim 12, wherein said video processor is operative in the special processing mode to locate spots in the data provided by the photoarray.

14. A high bandwidth multi-mode video processor comprising:

a digital camera including a photoarray for providing digital data in frames representative of spatial intensity distribution of input light incident on the photoarray synchronously at a selectable frame frequency;

means including a memory coupled to the digital camera for storing said data in the memory synchronously at said selectable frame frequency;

processing means for computing selectable algorithms on said data; and means coupled to said processor and to said storing means for providing a real-time processing mode where the data frames are processed at a rate synchronous with the frame rate and for providing a special processing mode where the data frames are processed at a rate longer than and asynchronous with the frame rate such that processing in the special mode preempts processing in the real-time mode;

wherein said processing mode providing means includes an interface between said memory and said electronic processing means providing means for selection of the real-time processing mode or the special processing mode.

* * * * *